(12) United States Patent
Grattan

(10) Patent No.: US 10,960,928 B2
(45) Date of Patent: Mar. 30, 2021

(54) VEHICLE STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 150 days.

(21) Appl. No.: 16/411,968

(22) Filed: May 14, 2019

(65) Prior Publication Data
US 2020/0361540 A1    Nov. 19, 2020

(51) Int. Cl.
*B62D 21/15*    (2006.01)
*B62D 25/20*    (2006.01)
*B62D 25/08*    (2006.01)
*B62D 27/02*    (2006.01)

(52) U.S. Cl.
CPC .......... B62D 21/155 (2013.01); B62D 21/152 (2013.01); B62D 25/082 (2013.01); B62D 25/2018 (2013.01); B62D 27/02 (2013.01)

(58) Field of Classification Search
CPC ........ B62D 21/02; B62D 21/11; B62D 21/15; B62D 21/152; B62D 21/155; B62D 21/157; B62D 25/082; B60R 19/02; B60R 19/023
USPC ....... 296/187.1, 187.12, 203.02, 203.03, 205
See application file for complete search history.

(56) References Cited

U.S. PATENT DOCUMENTS

| | | | |
|---|---|---|---|
| 8,393,669 B2 * | 3/2013 | Ajisaka | B62D 21/152 296/187.09 |
| 8,807,597 B2 * | 8/2014 | Akaki | B62D 21/152 280/784 |
| 8,985,258 B1 * | 3/2015 | Midoun | B62D 25/082 180/274 |
| 9,956,992 B1 | 5/2018 | Iimi et al. | |
| 9,988,090 B2 * | 6/2018 | Nishikawa | B62D 21/152 |
| 10,065,586 B2 * | 9/2018 | Barbat | B62D 21/152 |
| 10,093,358 B2 | 10/2018 | Tani et al. | |
| 10,256,015 B2 * | 4/2019 | Miwa | H01F 1/0536 |
| 10,315,700 B2 * | 6/2019 | Coppuck | B62D 23/005 |
| 10,780,921 B2 * | 9/2020 | Tasaka | B62D 25/082 |
| 2015/0246690 A1 * | 9/2015 | Matsumoto | B62D 21/152 296/187.1 |
| 2015/0321700 A1 | 11/2015 | Onoda et al. | |
| 2018/0022388 A1 | 1/2018 | Nishikawa | |
| 2019/0152530 A1 * | 5/2019 | Kato | B62D 25/2072 |

* cited by examiner

*Primary Examiner* — Jason S Daniels
(74) *Attorney, Agent, or Firm* — Global IP Counselors, LLP

(57) ABSTRACT

The vehicle structure includes a vehicle frame and a stop structure. The vehicle frame has a first side member and a second side member. The first and second side members have respective front ends with each of the first side member and the second side member extending rearward from the front ends in a vehicle longitudinal direction. The stop structure is installed to the first side member at a location rearward of a front suspension structure. The stop structure extends in an outboard direction from the first side member. The stop structure has a top surface, a bottom surface, a forward-facing surface, and a rear surface. The bottom surface has a concaved area that extends from the forward-facing surface to the rear surface. The concaved area is dimensioned to receive a conduit such that the conduit is received and at least partially concealed within the concaved area.

19 Claims, 6 Drawing Sheets

VEHICLE STRUCTURE

BACKGROUND

Field of the Invention

The present invention generally relates to a vehicle structure with a stop structure located rearward of a front wheel. More specifically, the present invention relates to a stop structure attached to portions of a vehicle frame, the stop structure located and dimensioned to absorb impact force from a front tire or wheel during an impact event, the stop structure being further configured to receive and at least partially conceal a conduit with, for example, a bundle of electrical wires or wiring harness installed therein.

Background Information

Vehicles include many different features and components connected together by various electrical controller(s) with hard wire connections therebetween. Such features and components include, for example, lights, entertainment related systems, safety systems and vehicle drive train control systems, all requiring electric power and wiring for electronic communication. The space needed to receive electrical wires and/or wiring harnesses, connectors and conduits that receive and protect wiring comes at a premium in modern vehicles, as weight reduction and aerodynamics have changed the designs of vehicles. Finding space on or within a vehicle body structure for wiring and/or conduits for wiring can be a challenge.

SUMMARY

One object of the present disclosure is to provide a vehicle with a stop structure with spaces dimensioned to receive and at least partially conceal a conduit that protects, for example, wiring and/or a wiring harness.

In view of the state of the known technology, one aspect of the present disclosure is to provide a vehicle structure with a vehicle frame, a front suspension structure and a stop structure. The vehicle frame has a first side member and a second side member. The first side member and the second side member have respective front ends with each of the first side member and the second side member extending rearward from the front ends in a vehicle longitudinal direction, the vehicle longitudinal direction being defined relative to a lengthwise direction of the vehicle frame. The front suspension structure is coupled to the first side member at a first location rearward of the front end of the first side member. The stop structure is installed to the first side member at a location rearward of the front suspension structure. The stop structure extends in an outboard direction from the first side member. The stop structure has a top surface, a bottom surface, a forward-facing surface, and a rear surface. The bottom surface has a concaved area that extends from the forward-facing surface to the rear surface, the concaved area being dimensioned to receive a conduit such that the conduit is received and at least partially concealed within the concaved area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
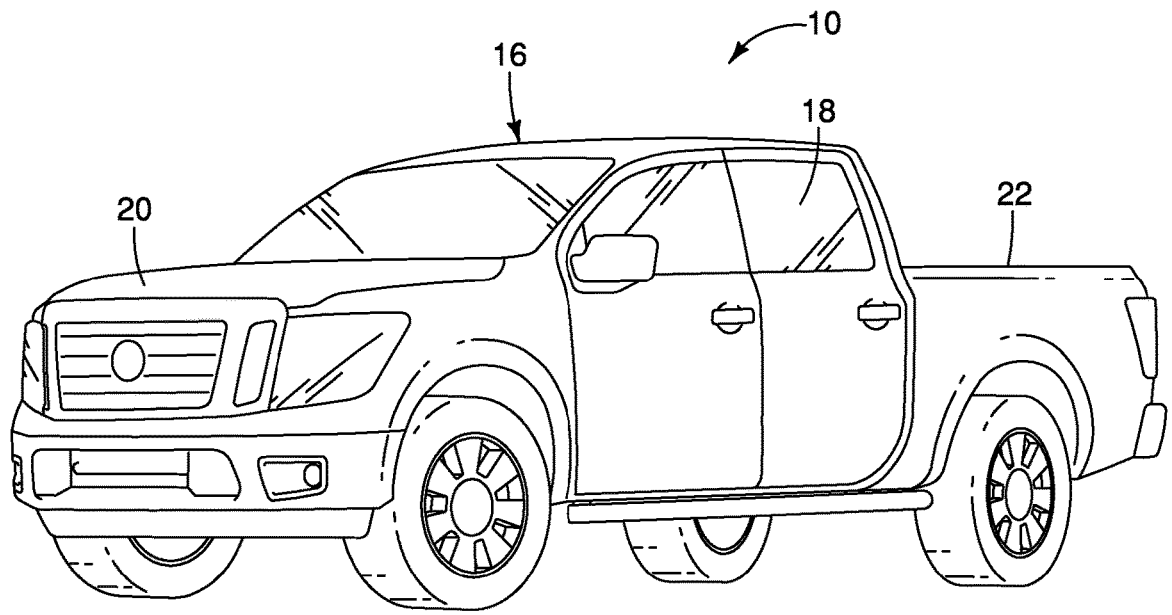
FIG. 1 is a perspective view of a vehicle that includes a stop structure in accordance with a first embodiment.

Referring initially to FIG. 1, a vehicle 10 with a stop structure 12 (FIG. 2) is illustrated in accordance with a first embodiment.

In FIG. 1, the vehicle 10 is depicted as a heavy-duty pickup truck. However, it should be understood from the drawings and the description herein, that the vehicle 10 can alternatively be an SUV (sports utility vehicle) or passenger vehicle such as a sedan or a coupe.

The vehicle 10 includes a frame 14. The frame 14 is therefore a rigid, strong structure able to withstand heavy duty usage. However, it should be understood from the drawings and the description herein, that the frame 14 and the stop structure 12 described below can be configured for smaller vehicles or larger vehicles and is not limited to usage in a heavy-duty truck such as the vehicle 10. In other words, the stop structure 12 can be used on any size vehicle that includes a frame such as or similar to the frame 14.

A body structure 16 that defines a passenger compartment 18 attaches to and is supported by the frame 14. The body structure 16 also defines an engine compartment 20 located forward of the passenger compartment 18 and a cargo area 22 located rearward of the passenger compartment 18.

It should also be understood from the drawings and description, that the stop structure 12 can also be employed with a unibody vehicle. A unibody vehicle is a vehicle that does not typically includes a separate frame such as the frame 14. Rather, the unibody vehicle includes various structural elements welded together such that body panel provide strength and rigidity thereby replacing some of the structural elements that define the frame 14. Elements of the unibody vehicle serve as frame elements functionally equivalent to the elements of the frame 14. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 14 (described in greater detail below). U.S. Pat. No. 9,180,913, also assigned to Nissan North America, also discloses a unibody vehicle body structure and further discloses an engine cradle. The elements of the stop structure 12 can be installed to portions of the unibody vehicle disclosed in U.S. Pat. No. 8,870,267 and portions of the engine cradle of U.S. Pat. No. 8,870,267. Both U.S. Pat. No. 8,870,267 and U.S. Pat. No. 9,180,913 are incorporated herein by reference in their entirety. Since unibody vehicles are conventional structures, further description is omitted for the sake of brevity.

Figure 2:
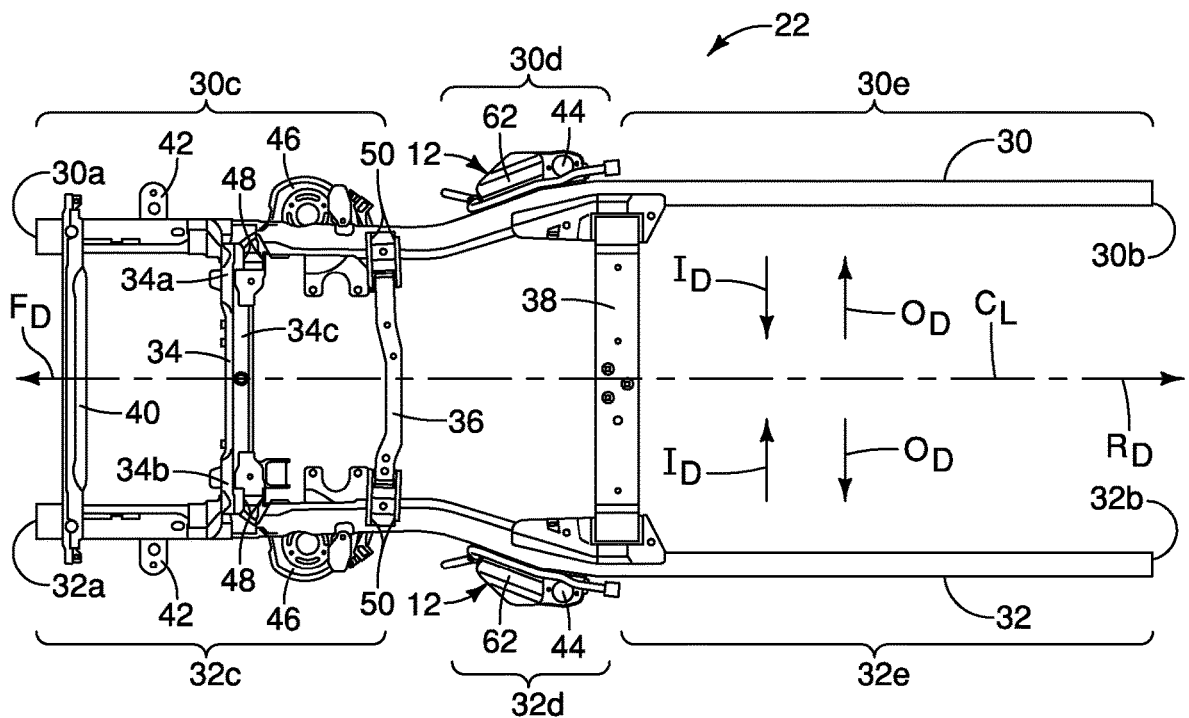
FIG. 2 is a bottom view (looking upward) of a frame of the vehicle depicted in FIG. 1, showing side members of the frame with the stop structures fixed to corresponding ones of the side members at opposite lateral sides of the frame in accordance with the first embodiment.

In FIG. 2 several directions relative to the frame 14 (and the vehicle 10) are shown in order to define orientations of the various features of the vehicle 10 and the stop structure 12. Specifically, the vehicle 10 and the frame 14 define a longitudinal center line $C_L$ that extends in a lengthwise direction of the vehicle 10 along a central portion of the vehicle 10. At a left-hand side of FIG. 2, a forward direction $F_D$ is indicated by the depicted arrow, and at a right-hand side of FIG. 2 a rearward direction $R_D$ is indicated by the depicted arrow. As well, inboard directions $I_D$ and outboard directions $O_D$ relative to the longitudinal center line $C_L$ are also shown in FIG. 2.

As shown in FIG. 2, the frame 14 includes a first side member 30, a second side member 32, a first cross-member 34, a second cross-member 36 and a third cross-member 38 and an optional front cross-member 40. FIG. 2 shows an underside of the frame 14. In other words, the depiction of the frame 14 is taken from below the frame 14 looking upward. The frame 14 is made of heavy gauge steel, but, can alternatively be made of other materials depending upon the overall design of the vehicle 10. It should therefore be understood that the first side member 30 extends along and under a driver's side of the vehicle 10, and the second side member 32 extends along and under a passenger's side of the vehicle 10.

The first side member 30 is an elongated beam (a first side member) that has multiple contours and shapes. Specifically, the first side member 30 has a front end 30*a* and a rear end 30*b*. The first side member 30 also has a first portion 30*c*, a second portion 30*d* and a third portion 30*e*. The first portion 30*c* extends in the rearward direction RD from the front end 30*a* to a location proximate the second cross-member 36. The first portion 30*c* is generally straight. The second portion 30*d* has a curved shape such that just rearward of the first portion 30*c*, the second portion 30*d* gradually curves in the outboard direction $O_D$. The third portion 30*e* is generally straight, but can include contours and curves, depending upon the overall design of the vehicle 10.

Similarly, the second side member 32 is an elongated beam (a second side member) that has multiple contours and shapes that are symmetrical to the first side member 30. Specifically, the second side member 32 has a front end 32*a* and a rear end 32*b*. The second side member 32 also has a first portion 32*c*, a second portion 32*d* and a third portion 32*e*. The first portion 32*c* extends in the rearward direction $R_D$ from the front end 32*a* to a location proximate the second cross-member 36. The first portion 32*c* is generally straight. The second portion 32*d* has a curved shape such that just rearward of the first portion 32*c*, the second portion 32*d* gradually curves in the outboard direction $O_D$.

The first portions 30*c* and 32*c* of the first and second side members 30 and 32 are a first distance away from one another, and the third portions 30*e* and 32*e* are a second distance away from one another, with the second distance being greater than the first distance.

The first and second side members 30 and 32 each include vehicle body attachment flanges 42 and 44 (cabin attachment flanges). The attachment flanges 42 and 44 are welded to the first and second side members 30 and 32 and are dimensioned and shaped to attach to the body structure 14 of the vehicle 10. The attachment flanges 42 extend from outboard sides of the first portions 30*c* and 32*c* of the first and second side members 30 and 32 forward of the first cross-member 34. The attachment flanges 44 extend from outboard sides of the second portions 30*d* and 32*d* of the first and second side members 30 and 32 rearward of the second cross-member 36.

Although not shown in FIG. 2, the third portions 30*e* and 32*e* of the first and second side members 30 and 32 can also include body attachment flanges configured for attachment to structures that define the cargo area 20 of the vehicle 10. Further, the third portions 30*e* and 32*e* can be at the same level above the ground as the first portions 30*c* and 32*c*, or, can be raised above the ground at a level higher that the first portions 30*c* and 32*c*, with the second portions 30*d* and 32*d* including an upward curvature. As shown in FIGS. 3-6, the second side member 32 has an upper surface 32*f* and a lower surface 32*g*.

As shown in FIG. 2, each of the first portions 30*c* and 32*c* of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm 52 for pivotal movement about pivot bolts 54. The lower control arm 52 is part of the steering and suspension structure of the vehicle 10. Since steering and suspension structures (and, in particular, control arm structures) are conventional vehicle components, further description is omitted for the sake of brevity.

The engine compartment 20 of the body structure 16 is approximately located in the space above and between the first portions 30c and 32c of the first and second side members 30 and 32. A front portion of the passenger compartment 18 is located in the space above and between the second portions 30d and 32d of the first and second side member rearward of the engine compartment 20. The remainder of the passenger compartment 18 and the cargo area 22 of the body structure 14 are located above the third portions 30e and 32e of the first and second side members 30 and 32.

A description of the vehicle body attachment flange 44 (referred to hereinafter as the cabin attachment flange 44) and the stop structure 12 is now provided with specific reference to FIGS. 2-10. There are two cabin attachment flanges 44. One is fixed to the first side member 30 and the other fixed to the second side member 32. Each of the cabin attachment flanges 44 is identical to the other, except that the cabin attachment flanges 44 are symmetrical mirror images of one another. For the sake of brevity, only one of the cabin attachment flanges 44 is described herein below.

Figure 3:
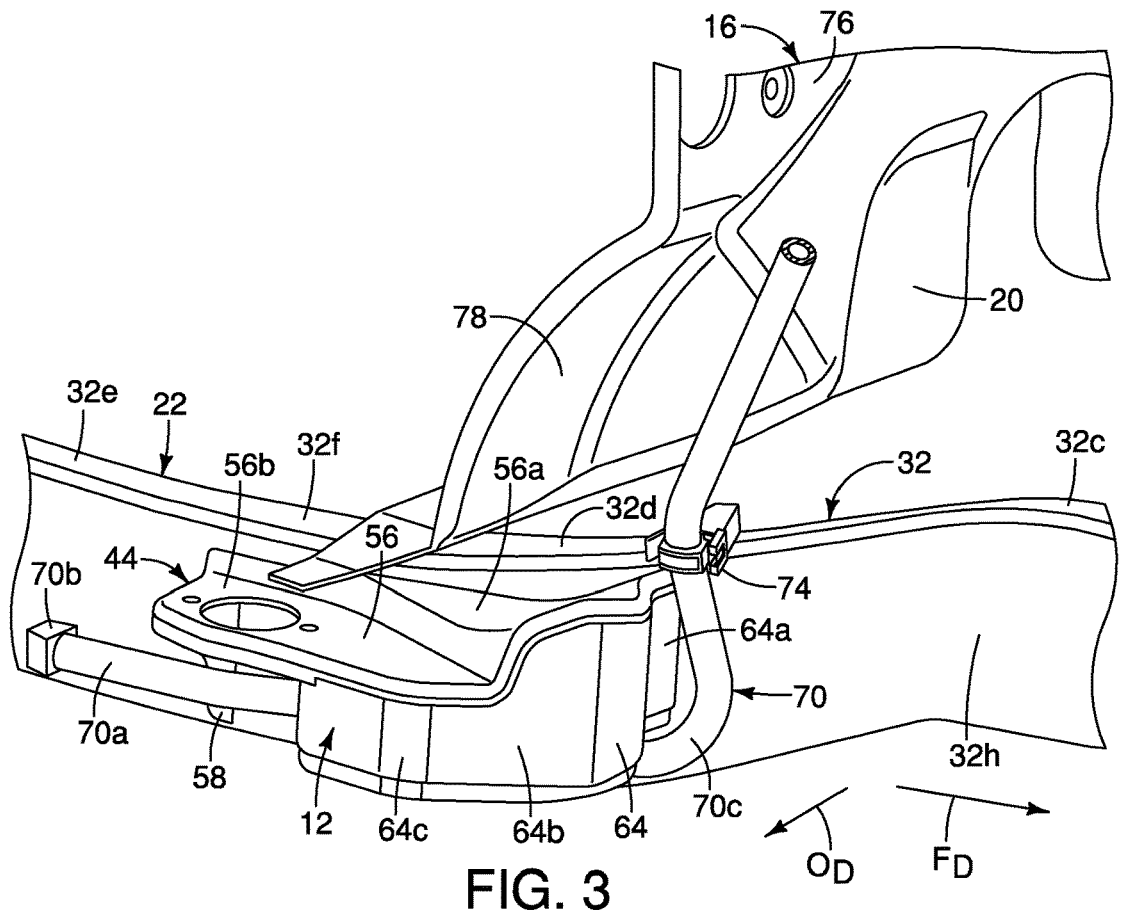
FIG. 3 is a perspective view of one of the side members showing a corresponding one of the stop structures fixed thereto and a conduit that is at least partially concealed within concaved areas in each of a bottom surface and a forward-facing surface of the stop structure in accordance with the first embodiment.
Figure 4:
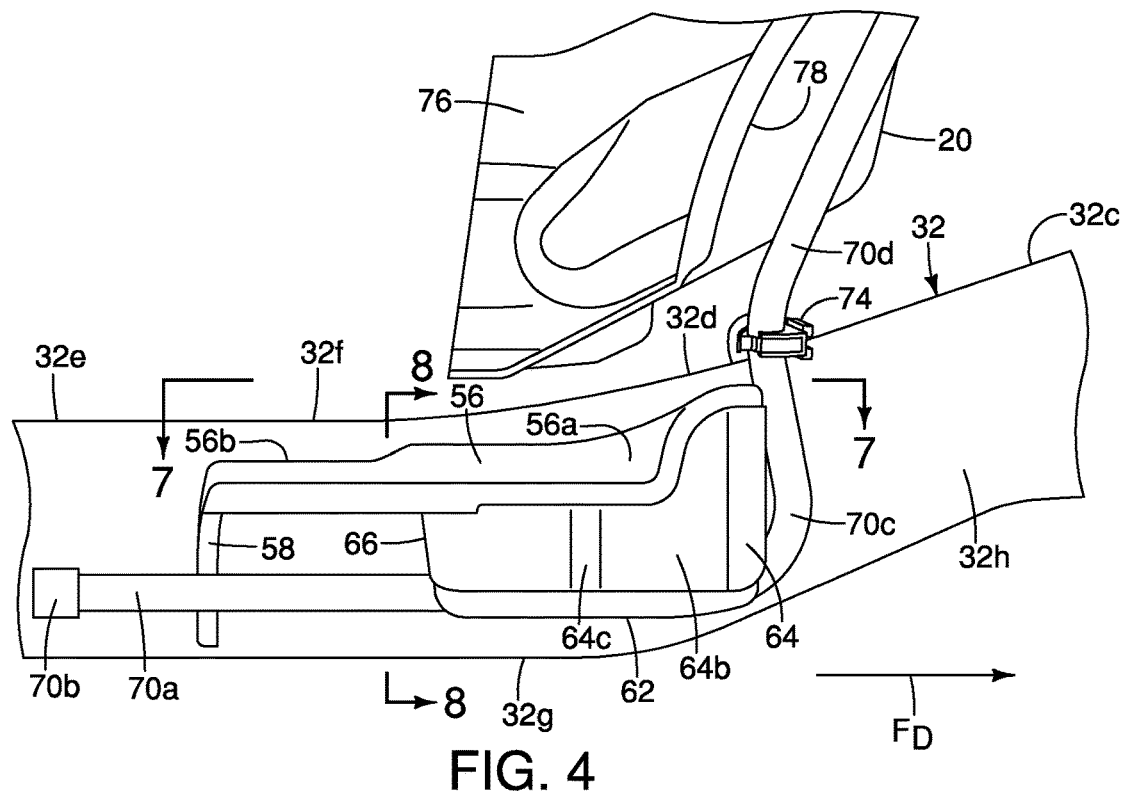
FIG. 4 is a side view of the one of the side members showing the stop structure fixed thereto and the conduit partially concealed within concaved areas in each of the bottom surface and the forward-facing surface of the stop structure in accordance with the first embodiment.
Figure 5:
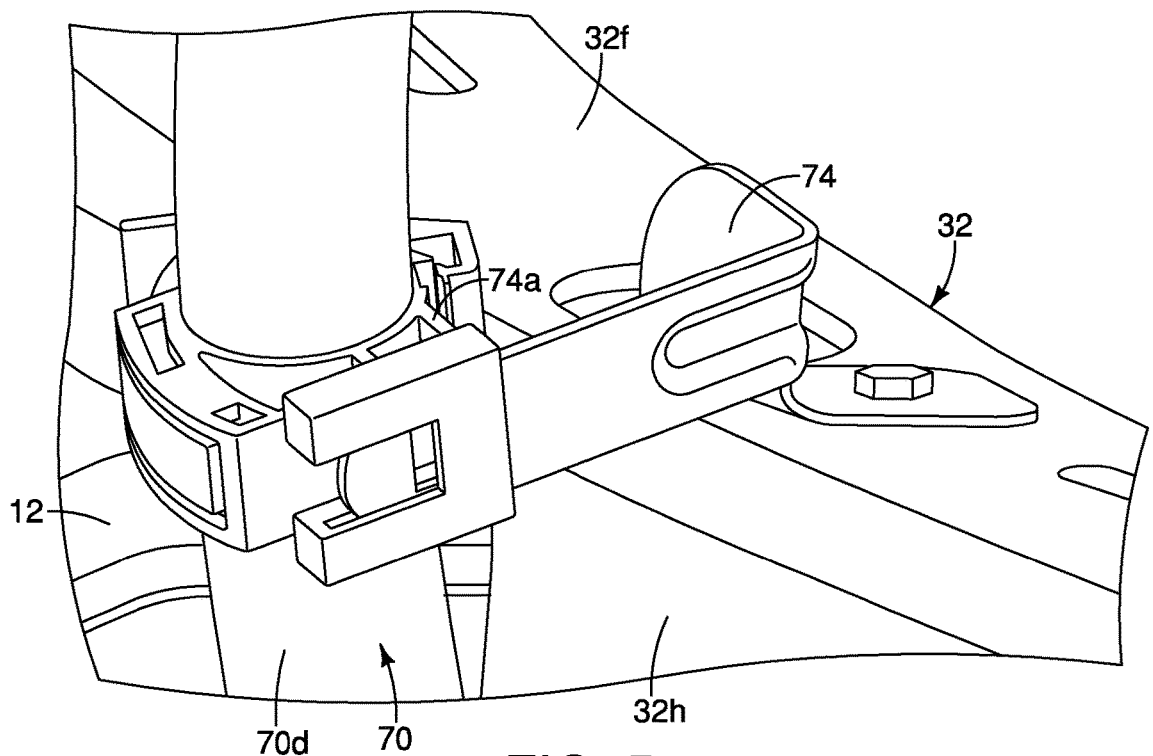
FIG. 5 is a perspective view of a forward portion of the stop member and adjacent portion of the side member of the frame showing the conduit secured to the side member via a bracket and ring clamp in accordance with the first embodiment.

As shown in FIGS. 2, 3 and 4, the cabin attachment flange 44 is fixed to an outboard surface 32h of the side member 32. The cabin attachment flange 44 basically includes an upper plate 56 and a support flange 58. The upper plate 56 of the cabin attachment flange 44 has a forward section 56a that defines the top surface of the stop structure 12 and a rearward section 56b that extends rearward from the forward section 56a and rearward of the stop structure 12. The support flange 58 is vertically oriented and is welded to both a rearward end of the upper plate 56 and the outboard surface 32h of the side member 32. The support flange 58 has an outboard surface that is partially visible in FIG. 3.

There are two stop structures 12 installed to the frame 22 of the vehicle 10. One is fixed to the first side member 30 and the other fixed to the second side member 32. Each of the stop structures 12 is identical to the other, except that they stop structures 12 are symmetrical mirror images of one another. For the sake of brevity, only one of the stop structures 12 is described herein below. Hereinafter, the second side member 32 is referred to as the side member 32.

As shown in FIG. 2, the stop structure 12 is installed to the side member 32 at a location rearward of the front suspension structure 50. Further, the stop structure 12 extends in an outboard direction $O_D$ from the side member 32. The stop structure 12 is a rigid structure made of metal that is welded or otherwise rigidly and fixedly attached to the outboard surface 32h of the side member 32.

Figure 6:
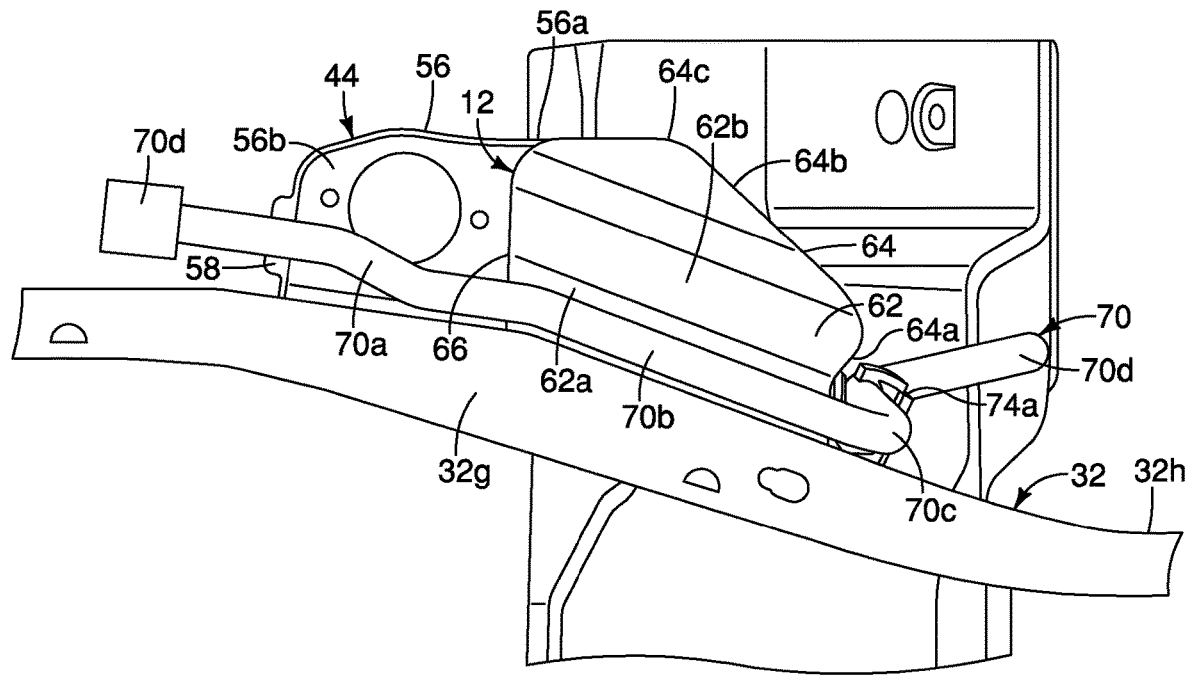
FIG. 6 is a bottom view of the side member and stop structure of the frame showing the concaved area formed on the bottom surface of the stop structure with the conduit installed along the concaved area in accordance with the first embodiment.
Figure 8:
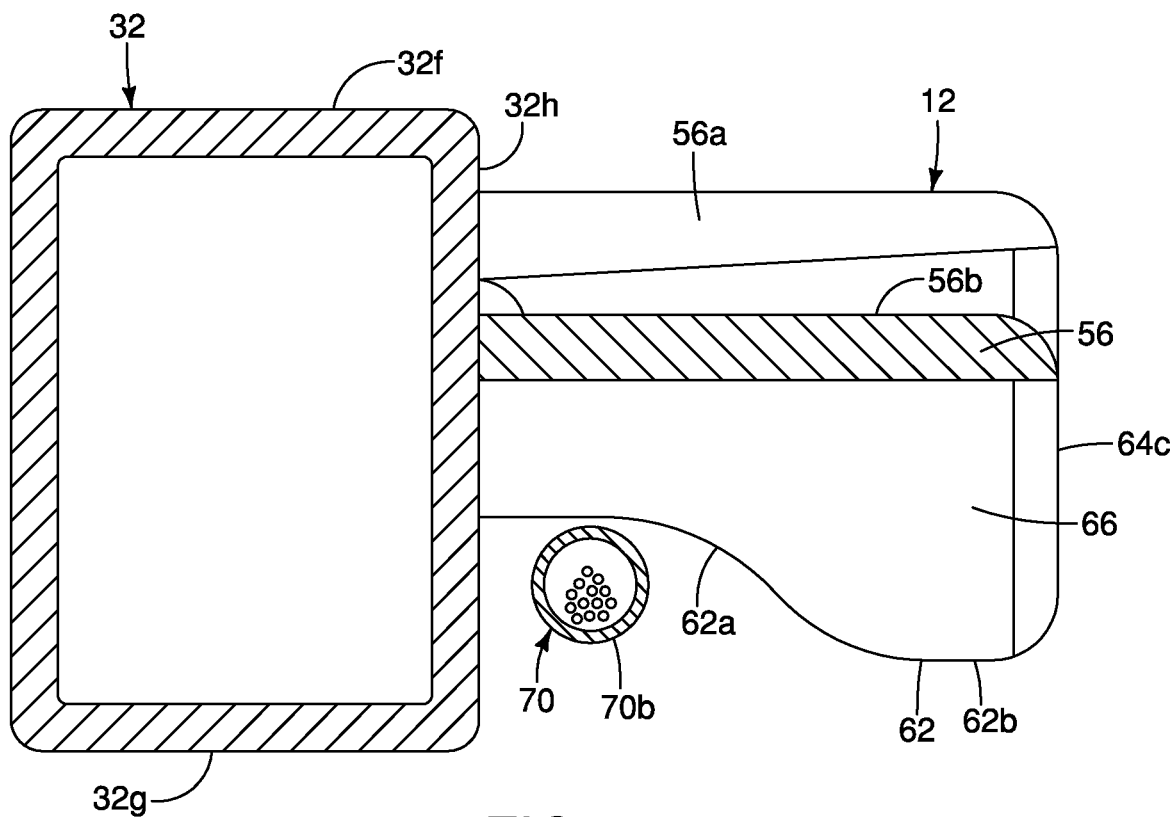
FIG. 8 is a cross-sectional view of the forward portion of the side member and the stop structure taken along the line 8-8 in FIG. 4, showing the conduit extending along the concaved area of the bottom surface of the stop structure in accordance with the first embodiment.

As shown in FIGS. 3-6, the stop structure 12 has a top surface defined by the forward section 56a of the upper plate 56 of the cabin attachment flange 44, a bottom surface 62, a forward-facing surface 64 and a rear surface 66. As shown in FIGS. 6 and 8, the bottom surface 62 has a concaved area 62a that extends from the forward-facing surface 64 to the rear surface 66. The concaved area 62a is dimensioned to receive a conduit 70 such that the conduit 70 is received and is at least partially concealed within the concaved area 62a. The concaved area 62a is horizontally oriented.

Figure 7:
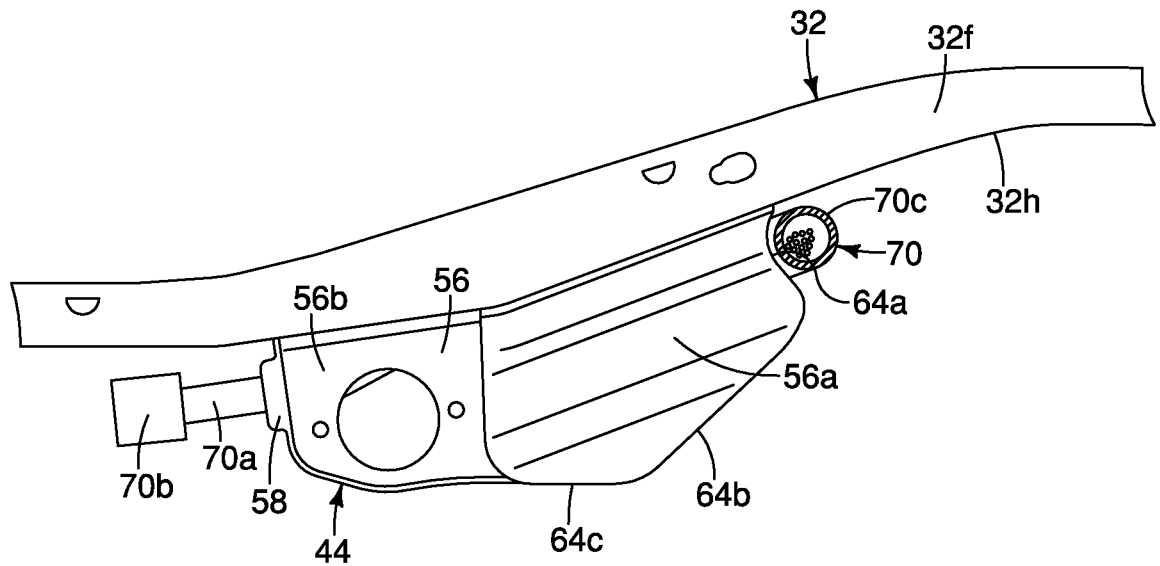
FIG. 7 is a top cross-sectional view of the forward portion of the side member and the stop structure taken along the line 7-7 in FIG. 4, showing the conduit extending along the concaved area of the front surface of the stop structure in accordance with the first embodiment.

As shown in FIGS. 3, 6 and 7, the forward-facing surface 64 has another concaved area 64a that extends from the top surface 56a to the bottom surface 62. The concaved area 64a is dimensioned to receive the conduit 70 such that the conduit 70 is received and is at least partially concealed within the concaved area 64a. The concaved area 64a is vertically oriented.

As shown in FIG. 6, the bottom surface 62 of the stop structure 12 includes a main section 62b. As shown in FIG. 4, the main section 62b of the bottom surface 62 of the stop structure 12 is located vertically higher than the bottom surface 32g of the side member 32. Further, the concaved area 62a of the bottom surface 62 being located vertically higher that the main section 62b of the bottom surface 62 of the stop structure 12 and the bottom surface 32g of the side member 32.

Further, the top surface of the stop structure 12 defined by the forward section 56a of the upper plate 56 of the cabin attachment flange 44 is located vertically lower than the top surface 32f of the side member 32.

As shown in FIGS. 6 and 8, the concaved area 62a of the bottom surface 62 is located adjacent to the outboard surface 32h of the first side member 32. As shown in FIGS. 3 and 6, the concaved area 64a of the forward-facing surface 64 is also located adjacent to the outboard surface 32h of the first side member 32. Further as shown in FIGS. 4 and 6, the rearward section 56b of the cabin attachment flange 44 extends rearward from the rear surface 66 of the stop structure 12.

As shown in FIGS. 3, 4 and 6, the forward-facing surface 64 of the stop structure 12 further includes a stop surface 64b and an outboard most surface 64c. The stop surface 64b defines an angle relative to the vehicle longitudinal direction (the longitudinal center line $C_L$) that is between 110 and 130 degrees.

As shown in FIGS. 7 and 8, the conduit 70 includes a hollow interior with a plurality of electric wires extending therethrough. The conduit 70 further includes a rear section 70a with a connector 70b, a mid-section 70b, a curved section 70c and an upwardly extending section 70d.

The rear section 70a of the conduit 70 and the connector 70b are located rearward of the stop structure 12. The mid-section 70b, of the conduit 70 is located within the concaved area 62a of the bottom surface 62 of the stop structure 12. The curved section 70c of the conduit 70 is at least partially located within the concaved area 64a of the forward-facing surface 64 of the stop structure 12. The upwardly extending section 70d of the conduit 70 extends upward from the curved section 70c to a dashwall 76 of the body structure 16 and into the engine compartment 20. A portion of the upwardly extending section 70d of the conduit 70 extends adjacent to a front wheel well 78 of the body structure 16 prior to entering the engine compartment 20.

The upwardly extending section 70d of the conduit 70 is held in place by a bracket 74 and a plastic clamp 74a. The bracket 74 is bolted to the upper surface 32f of the side member 32. The plastic clamp 74a is fixed to the bracket 74 and clamps around the conduit 70, as shown in FIGS. 3-6.

The wires within the conduit 70 can be used for any of a variety of electrically controlled systems of the vehicle 10, such as tail lamps, turn signal lamps, electric door locks, electric door opening mechanisms, and/or electric windows. Such systems are conventional features well known in the art. Therefore, description of these systems is omitted for the sake of brevity.

The concaved areas 62a and 64a provide a space to route wires within the conduit 70 along the frame 14 is a simple and protected manner. Further, since the conduit 70 is at least partially concealed within the concaved areas 62a and 64a, the conduit 70 is generally hidden from view.

It should be understood from the drawings and the description herein that the conduit 70 can also be used to route fluid filled tubes and/or hoses therethrough. For example, a tube that supplies windshield washer fluid to a rear window of the vehicle 10 can be routed through the conduit 70. Alternatively, or additionally, a coolant hose or refrigerant hoses can be routed through the conduit for secondary heating and air conditioning systems located in a rearward area of the passenger compartment 18.

SECOND EMBODIMENT

Figure 9:
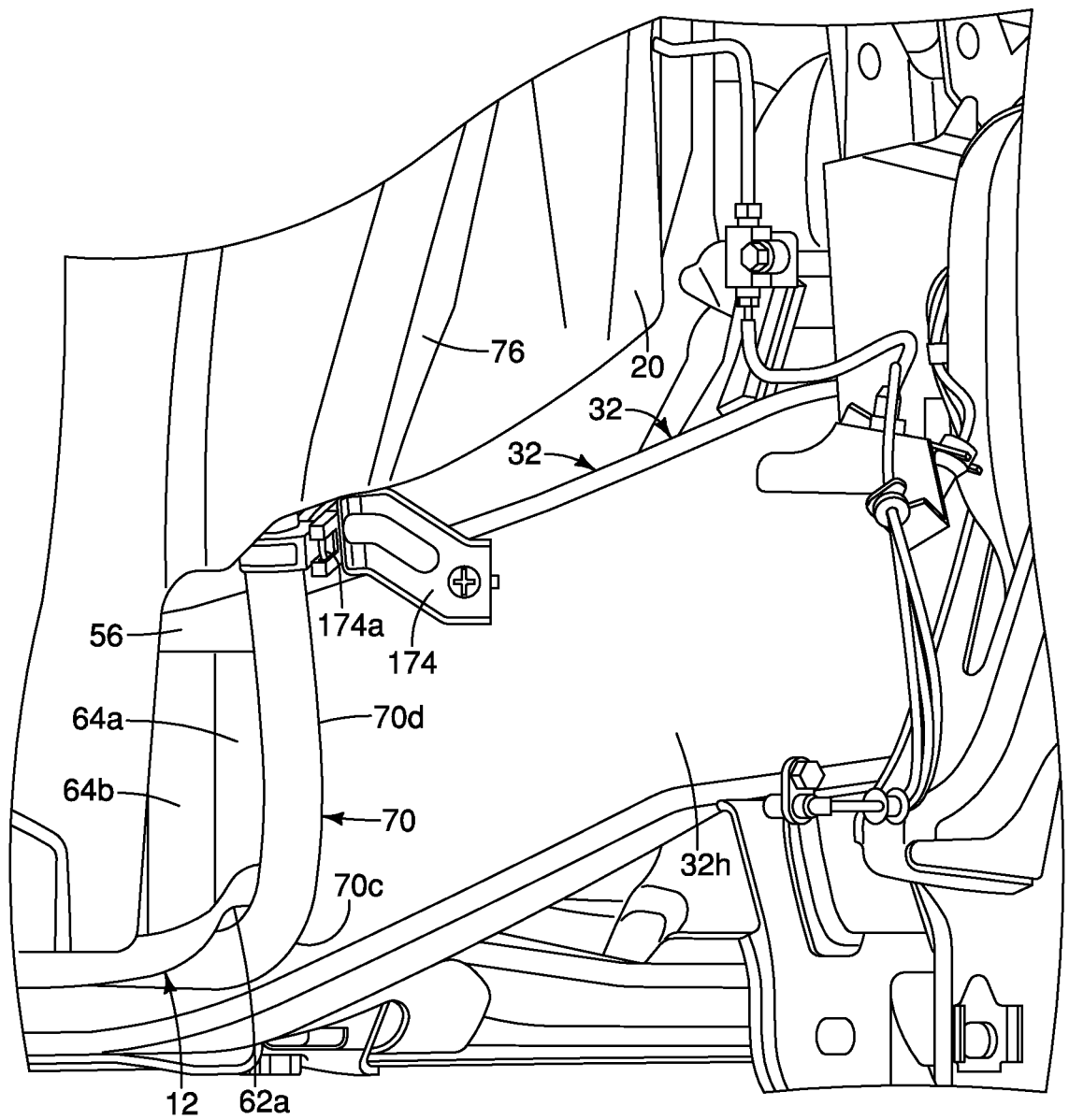
FIG. 9 is a perspective view of a wheel well area of the vehicle depicted in FIG. 1, showing a portion of the side member, a forward portion of the stop structure and the conduit extending along the concaved area of the forward-facing surface of the stop structure, and showing the conduit secured to the side member via a bracket and ring clamp in accordance with a second embodiment.
Figure 10:
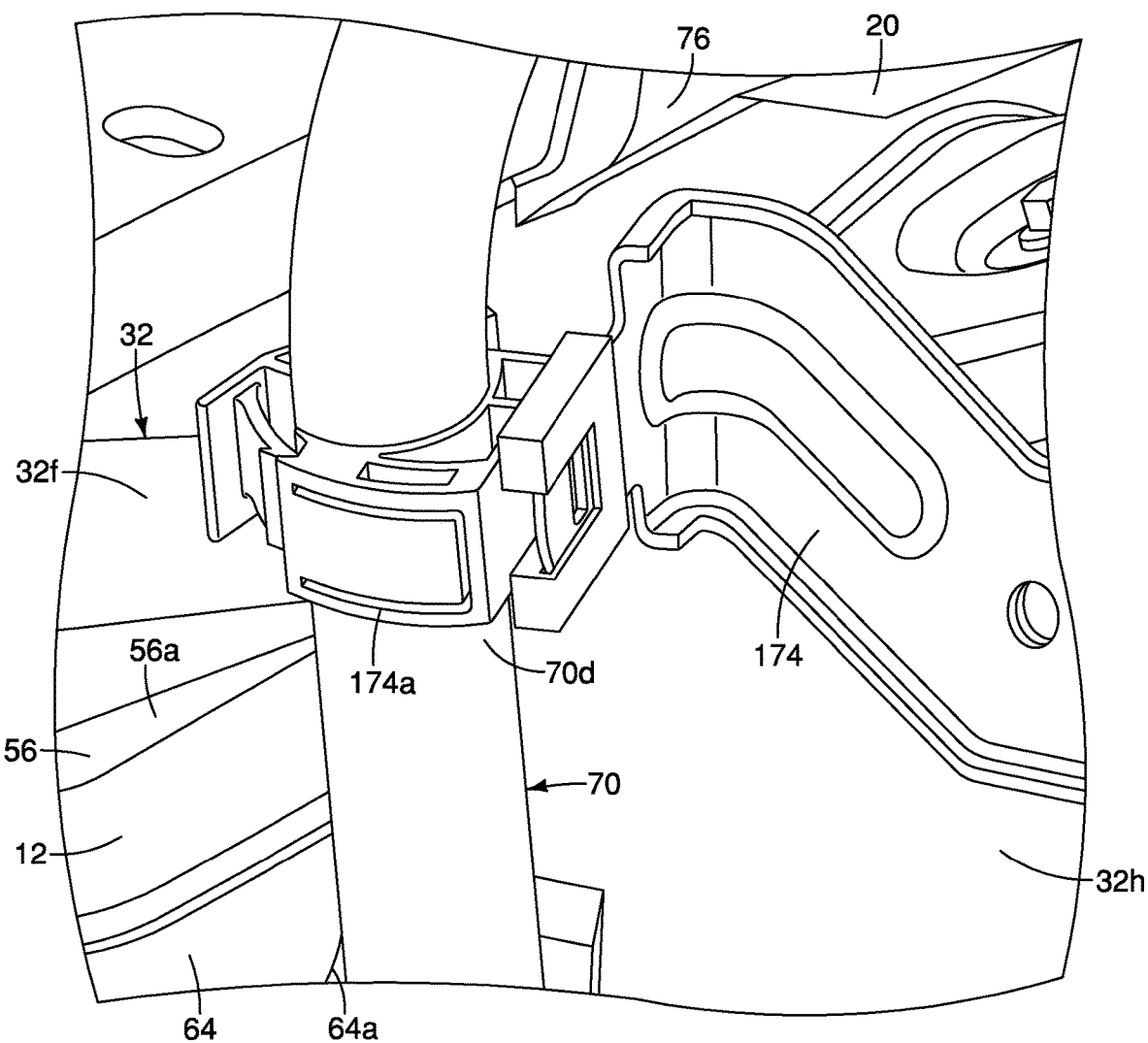
FIG. 10 is another perspective view of a wheel well area of the vehicle showing a portion of the side member, a forward portion of the stop structure and the conduit secured to the side member via the bracket and the ring clamp in accordance with a second embodiment.

Referring now to FIGS. 9 and 10, a bracket 174 and clamp 174a in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 9 and 10, the bracket 174 is attached to the outboard surface 32h of the side member 32. The clamp 174a is fixed to one end of the bracket 174 and clamps around the conduit 70.

The vehicle 10, the stop structure 12 and the frame 14 are as described in the first embodiment.

The various vehicle features (other than the stop structure 12 and conduit 70) are conventional components that are well known in the art. Since such vehicle features are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle structure. Accordingly, these terms, as utilized to describe the present invention should be interpreted relative to a vehicle equipped with the vehicle structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle structure comprising:
a vehicle frame having a first side member and a second side member, the first side member and the second side member having respective front ends with each of the first side member and the second side member extending rearward from the front ends in a vehicle longitudinal direction, the vehicle longitudinal direction being defined relative to a lengthwise direction of the vehicle frame;
a front suspension structure coupled to the first side member at a first location rearward of the front end of the first side member; and
a stop structure installed to the first side member at a location rearward of the front suspension structure, the stop structure extending in an outboard direction from the first side member, the stop structure having a top surface, a bottom surface, a forward-facing surface, and a rear surface, the bottom surface having a concaved area that extends from the forward-facing surface to the rear surface, the concaved area being dimensioned to receive a conduit such that the conduit is received and at least partially concealed within the concaved area.

2. The vehicle structure according to claim 1, wherein the first side member has a top surface and a bottom surface, and
the bottom surface of the stop structure includes a main section that is located vertically higher than the bottom surface of the first side member, with the concaved area of the bottom surface being located vertically higher that the main section of the bottom surface of the stop structure and the bottom surface of the first side member.

3. The vehicle structure according to claim 1, wherein the concaved area of the bottom surface of the stop structure is located adjacent to an outboard surface of the first side member.

4. The vehicle structure according to claim 1, wherein the forward-facing surface includes a second concaved area dimensioned to receive the conduit such that the conduit is received and at least partially concealed within the second concaved area.

5. The vehicle structure according to claim 4, wherein the second concaved area of the forward-facing surface of the stop structure is vertically oriented, and the second concaved area of the forward-facing surface of the stop structure is located adjacent to an outboard surface of the first side member.

6. The vehicle structure according to claim 4, wherein the concaved area of the forward-facing surface of the stop structure is vertically oriented and is located adjacent to an outboard surface of the first side member.

7. The vehicle structure according to claim 1, wherein the forward-facing surface of the stop structure further includes a stop surface and an outboard most surface, the stop surface defining an angle relative to the vehicle longitudinal direction that is between 110 and 130 degrees.

8. The vehicle structure according to claim 1, further comprising
a cabin attachment flange fixed to an outboard surface of the first side member, the cabin attachment flange having a forward section that defines the top surface of the stop structure and a rearward section that extends rearward from the forward section and rearward of the rear surface of the stop structure.

9. The vehicle structure according to claim 1, wherein the first side member has a top surface and a bottom surface, and
the top surface of the stop structure is located vertically lower than the top surface of the first side member.

10. The vehicle structure according to claim 1, wherein the conduit includes a hollow interior with a plurality of electric wires extending therethrough.

11. The vehicle structure according to claim 1, wherein the conduit includes a hollow interior with a plurality of electric wires extending therethrough.

12. A vehicle structure comprising:
a vehicle frame having a first side member and a second side member, the first side member and the second side member having respective front ends with each of the first side member and the second side member extending rearward from the front ends in a vehicle longitudinal direction, the vehicle longitudinal direction being defined relative to a lengthwise direction of the vehicle frame;
a front suspension structure coupled to the first side member at a first location rearward of the front end of the first side member; and
a stop structure installed to the first side member at a location rearward of the front suspension structure, the stop structure extending in an outboard direction from the first side member, the stop structure having a top surface, a bottom surface, a forward-facing surface, and a rear surface, the forward-facing surface having a concaved area that extends from the top surface to the bottom surface, the concaved area being dimensioned to receive a conduit such that the conduit is received and at least partially concealed within the concaved area.

13. The vehicle structure according to claim 12, wherein the first side member has a top surface and a bottom surface, and
the top surface of the stop structure is located vertically lower than the top surface of the first side member.

14. The vehicle structure according to claim 12, wherein the bottom surface includes a second concaved area dimensioned to receive the conduit such that the conduit is received and at least partially concealed within the second concaved area.

15. The vehicle structure according to claim 14, wherein the second concaved area of the bottom surface of the stop structure is horizontally oriented and is located adjacent to an outboard surface of the first side member.

16. The vehicle structure according to claim 12, wherein the first side member has a top surface and a bottom surface, and
the bottom surface of the of the stop structure includes a main section that is located vertically higher than the bottom surface of the first side member, with the second concaved area of the bottom surface being located vertically higher that the main section of the bottom surface of the stop structure and the bottom surface of the first side member.

17. The vehicle structure according to claim 12, further comprising
a cabin attachment flange fixed to an outboard surface of the first side member, the cabin attachment flange having a forward section that defines the top surface of the stop structure and a rearward section that extends rearward from the forward section and rearward of the rear surface of the stop structure.

18. The vehicle structure according to claim 12, wherein the first concaved area and the second concaved area are dimensioned to receive a conduit such that the conduit is received and at least partially concealed within the first and second concaved areas.

19. A vehicle structure comprising:
a vehicle frame having a first side member and a second side member, the first side member and the second side member having respective front ends with each of the first side member and the second side member extending rearward from the front ends in a vehicle longitudinal direction, the vehicle longitudinal direction being defined relative to a lengthwise direction of the vehicle frame;
a front suspension structure coupled to the first side member at a first location rearward of the front end of the first side member; and
a stop structure installed to the first side member at a location rearward of the front suspension structure, the stop structure extending in an outboard direction from the first side member, the stop structure having a top surface, a bottom surface, a forward-facing surface, and a rear surface, the forward-facing surface having a first concaved area that extends from the top surface to the bottom surface, the bottom surface having a second concaved area that extends from first concaved area of the forward-facing surface to the rear surface.

* * * * *